United States Patent [19]

Morin

[11] Patent Number: 4,932,447

[45] Date of Patent: Jun. 12, 1990

[54] TREE FELLING APPARATUS AND SAW TOOTH

[76] Inventor: Armand J. Morin, 98 des Places, Val-d'or, Quebec, Canada, J9P 5P4

[21] Appl. No.: 398,992

[22] Filed: Aug. 28, 1989

[51] Int. Cl.$^5$ ............................................. A01G 23/08
[52] U.S. Cl. ..................... 144/34 R; 83/839; 144/218; 144/241; 144/336; 407/33; 407/51
[58] Field of Search .............. 83/839, 840, 841, 842, 83/843, 844; 144/3 D, 34 R, 218, 241, 336; 407/33, 44, 47, 51

[56] References Cited

U.S. PATENT DOCUMENTS

| | | |
|---|---|---|
| 3,327,746 | 6/1967 | Andrus et al. |
| 3,860,051 | 1/1975 | Anson ................................. 144/241 |
| 3,915,209 | 10/1975 | Denis ............................. 144/34 R |
| 4,270,586 | 6/1981 | Hyde et al. ..................... 144/34 R |
| 4,563,929 | 1/1986 | Ringlee et al. ..................... 144/241 |
| 4,593,733 | 6/1986 | Hamilton ........................... 83/839 |
| 4,738,291 | 4/1988 | Isley .................................. 144/241 |
| 4,744,278 | 5/1988 | Wright ............................. 144/241 |

Primary Examiner—W. Donald Bray
Attorney, Agent, or Firm—Roland L. Morneau

[57] ABSTRACT

A concaved saw blade for tree felling apparatus adapted to be rotatably actuated through its center. The blade is inclined relative to the ground and is moved forwardly in a horizontal plane towards the tree to be cut. Saw teeth are adapted to be removeably mounted on the periphery of a rotatable saw blade of the flat or concave type. The teeth per se are made of a square head and a shaft extending rearwardly. The shaft is adapted to slide in a sleeve axially welded on the periphery of the saw blade. The shaft is adapted to be mounted in the sleeve in four different positions so that the head which is square and has a concave front face can make use of each of the four cutting edges surrounding the head for cutting trees.

9 Claims, 3 Drawing Sheets

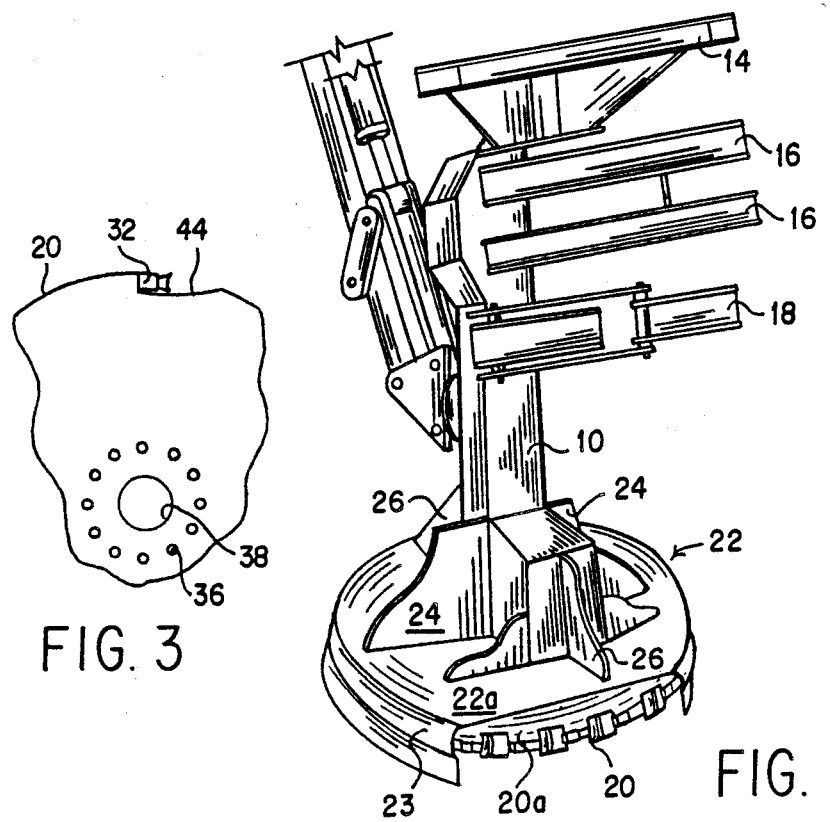
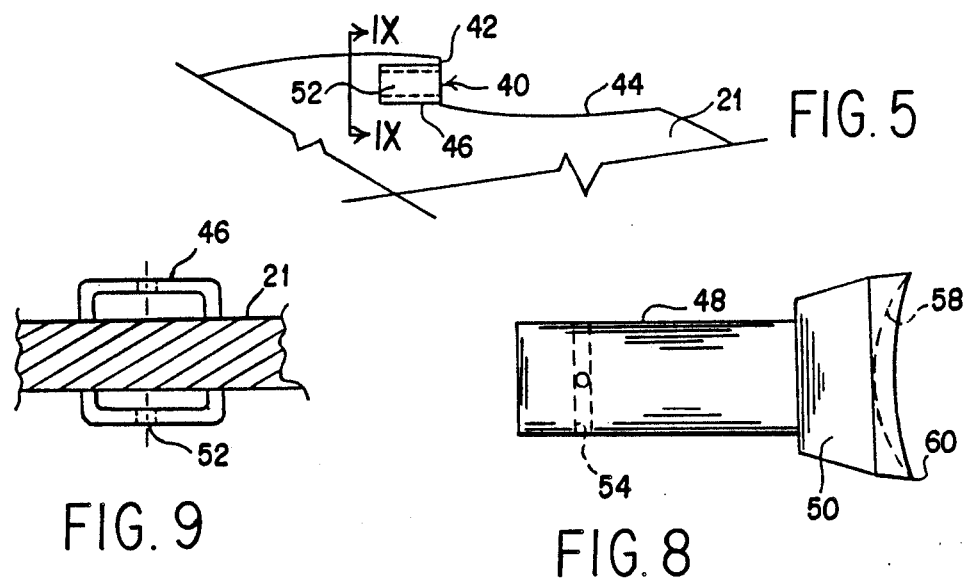

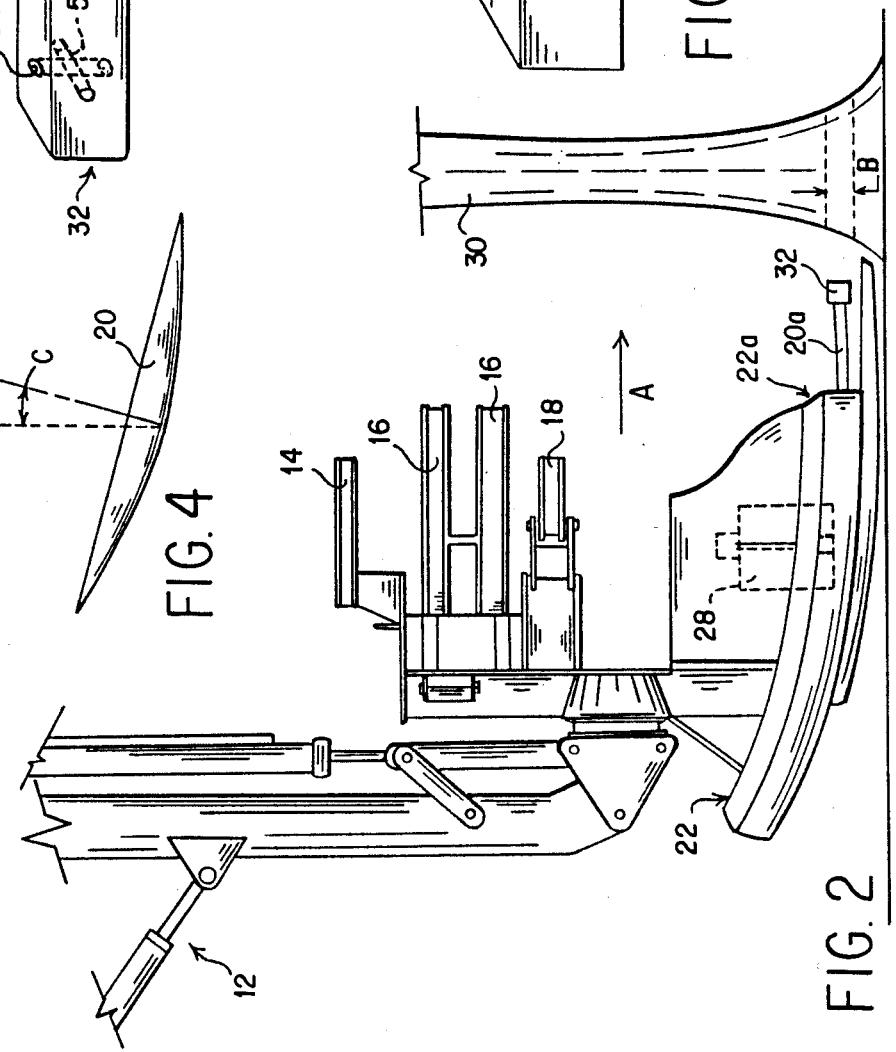

TREE FELLING APPARATUS AND SAW TOOTH

BACKGROUND OF THE INVENTION

1. Field of the Invention

The present invention relates to a tree felling apparatus having a curved saw blade substantially corresponding to a portion of a sphere. The invention is also directed to saw tooth adapted to be removably mounted at the periphery of the saw blade.

2. Prior Art

Canadian Pat. Nos. 983,825, 994,647 and 1,017,232 describe tree felling apparatus using a curved saw blade. In each of these cases, the saw blade is rotated through a power means acting on its periphery. Furthermore, the saw blade is actuated through a pendulum movement in the direction of the tree to be cut.

Canadian Pat. Nos. 1,012,038 and 1,074,212 disclose saw tooth of various shapes and uses. The tooth described in Canadian Pat. No. 1,012,038 have a curved face which is not oriented in the direction of travel of the blade or the chain, that is, the radius of curvature of the concave portion is not intended to be oriented in the tangential direction of the saw. The saw teeth are not square and do not need to be square. The same applies to Canadian Pat. No. 1,074,212 which has a tapered shape in order to provide free space between the work piece and the saw blade.

In U.S. Pat. Nos. 1,459,805 and 1,838,520 cutting tools are disclosed for use in turning, planing or boring tools. The cutter in such tools is provided with a concaved shape adjacent a tapered side but the cutter does not travel in a direction so that the radius of the concave surface remains parallel to the tangent of the blade.

SUMMARY OF THE INVENTION

In the present tree felling apparatus, the blade is made in the form of a spherical cap and is supported about its center by a shaft comprising means for rotating the saw blade about its central axis. Actuating means are foreseen for moving the actuating shaft in a horizontal plane, in the direction of the tree to be cut. The saw tooth are rigidly secured to the periphery of the blade and oriented in the direction of the tangent of the blade.

Each tooth has a square head with a front concave face and an axial shaft extending behind the head for supporting and securing the teeth on the saw blade. The axial shaft of the tooth is slidably mounted into a sleeve which is secured to the periphery of the saw blade. The axial shaft is adapted to be rotatably mounted in the sleeve in four orthogonal orientations corresponding to the four sides of the square head. The rotation of the tooth allows the cutting surface of the tooth to be oriented in four different positions for making use of each of the sides of the square head.

The head portion of the tooth is made of a material so that the inner surface of the concave portion has a hardness greater than the lateral portion of the head.

BRIEF DESCRIPTION OF THE DRAWINGS

FIG. 1 is a perspective view of the tree felling apparatus,

FIG. 2 is a side view of the tree felling apparatus adjacent a tree to be cut,

FIG. 3 is a top plan view of a sector of the saw blade used in the tree felling apparatus, FIG. 4 is a schematic view of the curved saw blade illustrating the allowable clearing of the blade, FIG. 5 is an enlarged top view of a section of the periphery of the saw blade adapted to receive a saw tooth, FIG. 6 is a perspective view of a square sleeve adapted to receive the axial shaft of the saw tooth, FIG. 7 is a perspective view of a saw tooth, FIG. 8 is a side view of the saw tooth, shown in FIG. 7, FIG. 9 is a rear view of a sleeve such as illustrated in FIG. 6 secured on the periphery of a saw blade.

DETAILED DESCRIPTION OF THE INVENTION

Figure 11:
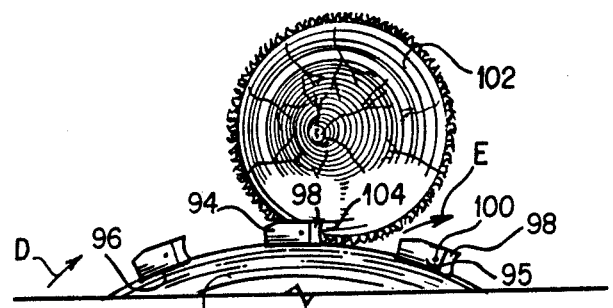
FIG. 11 is a schematic view of a saw teeth mounted on a saw blade in the process of cutting a tree.

The tree felling apparatus as shown in FIG. 1 comprises a supporting column 10 operated by a piston actuated mechanism 12 adapted to maintain the column in a vertical position and to move it in a substantially horizontal plane. The column 10 comprises known means such as arms 14, 16 and 18 adapted to hold, to grab and to accumulate cut trees.

The column 10 supports a circular concave saw 20 at its base with a casing 22 partially covering the blade 20. The casing 22 is rigidly held to the column 10 by radial plates 24 and 26 by welding both together. FIG. 2 schematically illustrates the column 10 having, at its base, a hydraulic motor 28 adapted to rotate saw blade 20 in the casing 22. The segment 20a of the saw blade projects outside the casing 22 for cutting the tree 30 around the trunc when the column 10 is horizontally moved in the direction of the arrow A.

The teeth 32 secured to the periphery of the blade 20 cut the tree through a thickness B and such a thickness is sufficient to allow the part of the trunc above the cut to rest on the front part 22a of the casing during and after the cutting operation of the tree 30, the latter being held in its vertical position by the arms 14, 16 and 18.

The saw blade 20 is held to the column 10 in a inclined position relative to the column. Such an inclination is made possible due to the concave structure of the blade and allows the segment 20a to be maintained in a substantially horizontal position while cutting through the tree 30. It is pointed out that a flat saw blade rotating through a tilted plane around a central axis would have a tendency to crack especially when such angle of inclination is changed.

Furthermore, the inclination of the saw blade provides a clearance between the ground and the blade under a portion of the blade behind the segment 20a. This clearance is very useful because the cutting of trees usually take place on uneven ground and this clearance will allow the cutting of the tree at a level closer to the ground then a flat saw blade. Accordingly, a shorter stump of the uncut trunk will remain on the ground which means a more complete use of the tree. A tree felling apparatus having a flat blade needs a working space which is at least equal to the surface of the casing surrounding the blade. With the back of the casing being tilted upwardly, a smaller working space is needed for lowering the blade especially during the winter or when the ground is covered with rocks or tree stumps.

The saw blade 20 which is particularly illustrated in FIGS. 3 and 4, has a thickness of about ⅜ inch and is fixed to a motor 28 by a set of bolts 36 concentrically mounted around a central shaft 38. The saw blade 20 has the shape of a portion of a sphere and is preferably made of steel. Threes having a diameter of about 20 inches have been cut with a curved blade having a chord or a span of 55 inches and a radius of curvature of 68 inches. The angle C (FIG. 4) between the axis of the blade at the apex of the latter and the vertical forms and inclination of about 11°. The casing 22 is formed by two superposed portions of similar spheres 40 and 42. The two sphere portions 40 and 42 have an outer diameter of about 56 inches and a radius of curvature corresponding to the saw blade 20. The casing portions 40 and 42 are rigidly secured around their periphery by a collar 23 of about 3 inches in thickness. The saw blade 20 and the casing 22 are made of steel of the 44 W type and have a thickness of ⅜ inch and ⅜ inch respectively.

A saw blade having the shape of a portion of a sphere has a strength and a resistance greater than a flat saw blade in that it will crack less easily. A curved saw blade allows a better visibility to the operator. Furthermore, the curved shape reduces the gyroscopic effect which reduces the speed at which the saw blade may be angularly changed. A flat saw blade has the known tendency to come back to its original horizontal position.

Furthermore, the curved saw blade being inclined relative to the tree 30 and the column 10, it will move forward and cut the tree horizontally. Such an arrangement eliminates the necessity of the pendulum movement of the blade which is required in Canadian Pat. No. 994,647. It is well known that the tilting of a heavy weight system is to be prevented.

The saw blade 20 illustrated in FIG. 3 shows one of the teeth 32 fixed to its periphery. In this embodiment, the blade 20 illustrated in FIG. 3, shows one embodiment of a saw tooth 32 secured to its periphery. The saw blade is provided with a series of recesses 40 (FIG. 5) displaying a radial face 42 forwardly preceeded by an indented curved 44. The radial face 42 is perforated by a circumferential hole to receive a tubular member 46 which is welded to the saw blade 20. The hollow part of tube 46 is dimensioned to receive the shaft 48 of the saw tooth 32. The head of the saw tooth 50 abuts against the radial face 42. The shaft 48 is dimensioned so that it will be securely retained by the tube 46 when the cutting edge of the head 50 bites on the tree 30. In order to prevent any longitudinal movement of the shaft 48, a perforation 52 extends through the tube 46 and orthogonal perforations 54 extend through the shaft 48 to receive a locking pin 56. Any play which may exist between the shaft 48 and the tube 46 is quickly eliminated by the saw dust penetrating therethrough. In the embodiment shown in FIGS. 6, 7 and 8, the tube 46 and the shaft 48 are square as well as the head 50 so that when the shaft 48 is rotated in the tube 46, each side of the cutting head 50 can be used to bite through the tree and cut the latter.

The head portion 50 of the cutting tooth is made of a square steel plate having a generally trapezoidal cross-section. The front part 58 of the head 50 constituting the base of the trapeze is concave to form cutting edges 60 on the four sides of the front surface of the head 50. Each of the four cutting edges 60 may be used by turning the head around the axis of the shaft 48 in the tube 46.

The tube 46 is preferably opened at both ends to allow and facilitate the removal of the shaft 48 when the latter is jammed by the saw dust in the tube 46. FIG. 9 shows the rear view of the tube 46 and apertures through which a punching instrument can be introduced for releasing the shaft 48 with the help of a hammer.

FIG. 9 also shows that the tube 46 is centered on the saw blade 22. However, it is possible to weld the tube 46 so that the latter is not centered over the surface 21 of the blade. If the cutting height B (FIG. 2) of the cutting head 50 needs to be increased, the tube 46 can be welded in a staggered manner one after the other. The height B should preferably have a predetermined dimension for allowing the curved saw blade through the thickness B of the saw cut. The height B should correspond to the rise of the cambers of the saw blade which penetrates through the tree.

Cutting edges 60 having a length of 2 inches have been used for a saw blade 20 having a curve whose radius is about 68 inches and for a sphere portion having a chord of 56 inches. If a greater thickness is required, the saw teeth need to be decentered relative to the periphery of the blade 20. If the tree felling apparatus is intended to cut trees of a larger size than 20 inches, the thickness of the steel of the casing 22 is increased to about ¾ inch. Saw blade 20 can rotate to a speed between 900 and 1800 rotations per minute and the hardness of the steel of the blade is about 50 W. The saw teeth can be made of iron which is relatively soft but which is subsequently harde. A process to harden the front curved surface 58 of the head of the saw tooth consists of spreading a powder of tungsen carbide and melting such substance with a blow torch. The cutting edges may be sharpened after such process. Considering that the head 50 may be made of a relatively soft iron and that the front curved surface is hardened, the side of the head 50 will be slightly worn out by the friction of the wood of the tree which is cut while the hardened surface wear more slowly. This relative wearing of both surfaces allows the cutting edges to remain sharp for a longer use.

The saw blade as described above, and which rotates at a speed of 1450 r.p.m. has been made with 22 saw teeth evenly spread on its periphery.

The curved saw blade 20 as illustrated in FIGS. 2 and 4 show a tangential plane of attack relative to the tree 30. The inclination of the saw allows a substantial clearance for about ⅝ of the lower surface of the casing 22.

Considering that the ground surface adjacent the trees to be cut are ondulated and covered with debris of all sorts, it is difficult to lower a flat circular blade close to the ground. With the concave circular blade, it is possible to cut a tree much closer to the ground considering that part of the blade curves away from the ground. Accordingly, a curved saw blade allows a better utilization of the trees. This advantage is particularly useful during the winter because the snow prevents the blade from being lowered close to the ground. Compared to the circular flat blade, the use of the concave saw blade allows a better visibility for the operator, requires a smaller operating surface in front of the tree and decreases the gyroscopic effect which slows the cutting operation.

Furthermore, the curve in the saw blade reduces the problem of cracks in the blade and allows the use of larger saw teeth.

An additional difference with the curved saw blades described previously in the prior art, the present saw blade can rotate at a higher speed and does not cut according to a pendulum movement which extens the central axis of the curvature of the saw blade. The accumulation of the cut trees is accordingly easier and the weight of the pendulum system is eliminated.

The saw teeth according to the present invention, can be easily replaced by punching them out from their socket or sleeve 46, while in the forest, and can be rotated in the sleeve for using a different cutting ledge. Four cutting edges are used before the saw tooth needs to be sharpened.

The curvature of the casing 22 surrounding the saw blade 20 also provides an increase in rigidity which is particularly useful on ground covered with stumps and rocks.

Figure 10:
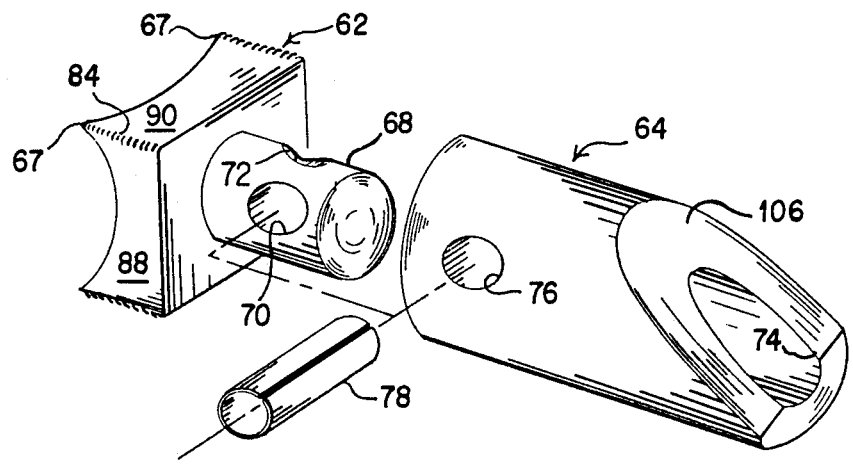
FIG. 10 is a perspective exploded view of an alternative embodiment of a saw tooth and a corresponding sleeve.

FIG. 10 illustrates an alternative embodiment of the saw tooth 62 and the sleeve 64. The saw tooth 62 has a square head 66 and a cylindrical shaft 68 extending behind head 66. The shaft 68 is perforated by a pair of orthogonally disposed holes 70 and 72 located in the same plane. The tube 64 is made of a rigid steel-base material having an inner diameter 74 corresponding to the diameter of the shaft 68 for an easy penetration of the latter. The sleeve 64 is provided with an aperture 76 extending throughout the sleeve. The aperture 76 is located relative to the holes 70 and 72 so when the sleeve abuts against the back of the head 66 they will be aligned to allow the introduction of a split ring 78 through both the aperture 76 and one of the holes 70 and 72. The split ring locks the saw tooth 62 in the tube 64 in one of the four orthogonal positions intended for the head 66 is concaved as explained for the embodiment illustrated in FIGS. 7 and 8. The four corners 67 of the head 66 are rounded off or bevelled to remove the needle-shape of the corners formed by the intersection 84 of the sides such needle-shaped protrusion has a tendency of tear-off the wood of the tree when it bites in it.

As explained above, the concave surface 80 of the saw tooth 62 is made of a harder material than the remaining part of the head 66. Accordingly, the faster wear of the lateral sides such as sides 88 and 90 due to the friction on the tree will maintain the sharpness of the edge in contact with the tree because the inner surface 80 will not wear as fast. For this reason, the embodiment shown in FIG. 10 has a head 66 with lateral sides 88, 90 and the other lateral sides perpendicular to the tangential direction of the teeth.

Saw teeth such as illustrated in FIG. 10 or FIGS. 7 and 8 are not exclusively adapted to be mounted on the periphery of curved or concaved saw blades but also on flat saw blades such as illustrated in FIG. 11. Flat saw blade 92 in FIG. 11 is illustrated with three saw tooth secured on its periphery. The sleeve 94 is welded at 96 to the periphery of the blade 92. Subsequently, the saw tooth 98 is introduced into the sleeve 94 and locked in place with the split ring 100. In operation, the saw blade 92 is rotated in the direction D so that the tooth 98 can make contact with the tree 102. The edge 104 of the tooth 98 bites into the periphery of the tree 102. The wood chips resulting from the cut of the tree are projected onto the concave front surface 80 (FIG. 10) of the tooth and are generally projected out in the direction of the arrow E. The rear part of the tube 94 is flattened out such as shown by surface 106 in FIG. 10 to facilitate the elimination of any saw dust and saw chips which may have reached the rear end of the sleeve 95 and to clear any unexpected obstructions.

As explained above, the lateral surface of the tooth 98 which comes in contact with the tree 102 has a tendency to wear faster then the front concave surface of the tooth because it is made of a material softer than the one on the front concave surface such as 58 in FIG. 7. When the cutting edges of the tooth coming in contact with the tree are dull, the tooth can be rotated as explained above so that a new cutting edge faces the tree to be cut. This procedure reduces the frequency of maintenance of the saw blade and this is particularly interesting considering the sharpening of the tooth needs to be done generally in a machine shop instead of on the premises, i.e. in the woods.

Figure 12:
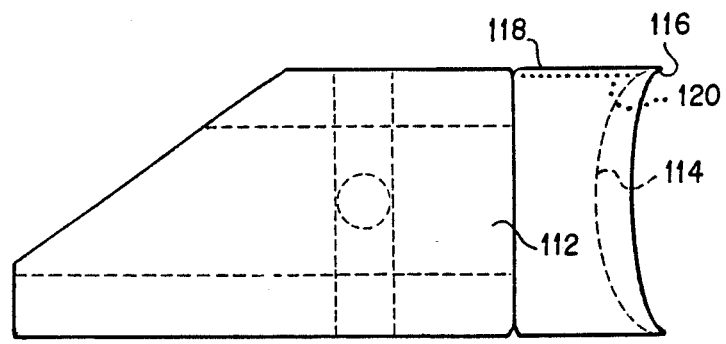
FIG. 12 is a cross-sectional view of the head of a saw tooth as shown in FIG. 10.

FIG. 12 illustrates more clearly the head 110 of the saw tooth which is made of a relatively soft metal in its core 112 and which is lined along its concave surface 114 with a harder metal or lining. If the cutting edge is 116 and the original lateral side 118 is frictionally in contact with the tree during the cutting operation, the wear will bring the lateral side 116 down to the dotted line 120 but the sharpness of the cutting edge 116 will be maintained until the hard surface 114 does not intersect with the lateral side 120. Such a combination of material also extends the lifetime of the cutting tooth during its working operation before it is brought back to a machine shop.

I claim:

1. A rotatable saw blade for a tree felling apparatus, said blade comprising:
   a large circular metal disc;
   a plurality of tubular members rigidly secured along the periphery of said disc, the axis of said tubular members oriented parallel to the tangent of the said disc;
   a saw tooth adapted to be mounted in each of the tubular members, said tooth comprising a square head having a concave front face, four lateral faces and a shaft centrally extending from said head opposite said front face, the cross-section of said shaft adapted to fit into each of said tubular members, said concave front face being oriented in the direction of rotation of the blade, said front face forming cutting edges at its intersection with the lateral faces of said head, means for retaining said shaft in said tubular member, whereby the one of the cutting edges most remote from the center of the circular disc is adapted to cut a tree during the rotation of the blade.

2. A rotatable saw blade as recited in claim 1, wherein two of the lateral faces are parallel to the periphery of the disc, said shaft and said sleeve being provided with transversal holes, locking pins adapted to be inserted into said holes for locking said shaft and said sleeve together.

3. A rotatable saw blade as recited in claim 2, wherein the shaft can be locked into four angularly different positions relative to the sleeve.

4. A rotatable saw blade as recited in claim 2, wherein the metal disc is concave and adapted to be rotatably actuated about its center.

5. A saw tooth for cutting trees adapted to be secured to the periphery of a rotatable circular saw blade having cylindrical sleeve members tangentially oriented on the periphery of said blade, said tooth comprising a square head having four lateral faces and a concave front face, said concave front face forming a cutting edge at each intersection with one of said lateral faces, a cylindrical shaft secured to said head and extending from said head in a direction opposite said front face, means for securing said shaft in said tubular sleeve member in four angular directions, so that each of said lateral faces can selectively be disposed in a position remote from the center of said blade, whereby each of the cutting edges is adapted to cut a tree during the rotation of the blade when the corresponding lateral face is disposed in said remote position.

6. A saw tooth as recited in claim 5, wherein said shaft is provided with two transversal holes disposed at 90° from each other, said holes adapted to be aligned with a corresponding transversal perforation in the sleeve member, pin means adapted to be inserted through said perforation and one of said holes for locking said shaft to said sleeve member.

7. A saw tooth as recited in claim 5, wherein the lateral faces are tapering in the direction of the shaft.

8. A saw tooth as recited in claim 5, wherein each intersection of adjacent lateral faces is bevelled for flatening out the needle-shaped protrusion formed at the intersection of the cutting edges.

9. A saw tooth as recited in claim 5, wherein the pin means is a split ring.

* * * * *